UNITED STATES PATENT OFFICE.

ALEXANDER CLASSEN, OF AACHEN, GERMANY, ASSIGNOR, BY MESNE ASSIGNMENTS, TO THE CHEMICAL FOUNDATION, INC., A CORPORATION OF DELAWARE.

METHOD OF OXIDIZING AMMONIA.

1,322,291.  Specification of Letters Patent.  Patented Nov. 18, 1919.

No Drawing.  Application filed January 24, 1916.  Serial No. 74,007.

*To all whom it may concern:*

Be it known, that I, ALEXANDER CLASSEN, a subject of the German Emperor, and resident of Aachen, Germany, have invented certain new and useful Improvements in Methods of Oxidizing Ammonia, of which the following is a specification.

My invention relates to a method of catalytically oxidizing ammonia gas with a view to obtaining nitrogen oxids.

It is well known that by passing a mixture of ammonia and air over catalytically active substances at an elevated temperature nitrogen oxids can be obtained. Quite a number of catalytically active substances, most of them metals and metallic oxids, have been proposed for carrying out this process, such substances being designed to be employed either alone or in combination with suitable carriers.

I have now ascertained that the chemical nature of the carrier is of paramount importance with regard to the result of the catalytic oxidation which is to take place. For instance, if catalytically active substances such as oxid of copper or some other suitable metallic oxids are used on the one hand in combination with well known carriers such as asbestos, fire-bricks, meerschaum, clay and the like, and on the other hand with basic carriers such as the oxid of magnesium, barium, calcium, zinc or the like, there will result in the latter case an astonishing increase of the catalytic effect which will appear as a considerably higher output of nitrogen oxids.

Upon further investigating this astonishing fact I have ascertained that the favorable action of basic carriers is not limited to their combination with metallic oxids but will take place also in the case that the basic carriers are combined with other catalytically active substances suitable for the oxidation of ammonia. In consequence thereof the basic substances in question can not be considered merely as carriers as far as the reaction in question is concerned, and it seems that the good results obtained with their aid are obtained through a combination effect between the catalytically active substances proper (metallic oxids, metals and the like) and the basic substances. The success obtained by the combined application of these substances is the more surprising as the basic substances in question do not by themselves exert any catalytic action in the oxidation of ammonia.

Therefore my invention consists in the application of the catalytically active substances proper such as substances containing one or more of the trivalent metals manganese, iron, ruthenium, and chromium, which are suitable for oxidizing ammonia gas, in combination with highly basic substances, preferably such as consist of or contain highly basic metal oxids. On the basis of my invention it is easy to prepare a great number of efficient catalytic agents by simple tests.

The catalytically active substances proper, such as metals, metallic oxids or other combinations of metals, may be employed either singly or in plurality and in the latter case they may either form a mixture or an alloy or a chemical combination. In a like manner the basic substances serving as carriers may be employed either singly or in plurality, in the latter case as a mixture or under the form of a chemical combination, and they may as well be combined with other substances in the manner mentioned above, provided their basic character is retained. Thus for instance aluminates are highly efficient carriers for use in carrying out the present invention.

I have further ascertained that the favorable action of the contact bodies or catalytically active combinations obtained in accordance with the present method are dependent to a high degree on the relative quantities of the catalytically active substances proper and the carriers. In general it is preferable to employ the carrier in great excess of the catalytically active substance proper. For instance an efficient catalyst of oxid of copper and oxid of magnesium requires about two hundred grams of magnesia and five to thirty-five grams of solid nitrate of copper.

I have further ascertained that apart from the basic nature of the contact carrier also its physical qualities play an important role. Heretofore those carriers have been considered to be most efficient which have a very large volume as compared with their mass, such as for instance porous bodies; in contradistinction to this experience I have ascertained that the basic contact carriers according to my invention require a greater density in order to be more efficient. Thus for instance a specifically heavier magnesite is a better contact carrier than a specifically lighter one. In consequence thereof I prefer densifying porous contact carriers, for instance by sintering them by heating to a high temperature or by impregnating them with a metal salt solution and then heating them. Thus a highly efficient carrier is obtained from magnesium oxid by impregnating the roasted oxid with a solution of magnesium nitrate and transforming the latter into oxid by roasting the mass. By this treatment an artificial densification is caused to take place within the pores of the oxid by the oxid formed from the nitrate.

As has been mentioned the basic carriers may be combined with all kinds of catalysts. The catalysts most suitable for use in this combination are for instance the different metal oxids having catalytic qualities, chromates, chromites and also metallic catalysts the foremost of which are certain precious metals.

Example I: Grains or pieces of magnesia are impregnated with solutions of nitrate of manganese, iron or copper, or with solutions of other suitable metal salts leaving behind oxids on being heated, and the grains or pieces thus impregnated are then roasted until the nitrates have been decomposed.

Example II: A non-basic porous carrier is impregnated with a solution of a salt of calcium, magnesium, zinc, or another salt leaving behind a strongly basic oxid after roasting, and the carrier is then immersed in the solution of a suitable manganese salt. After drying and roasting a mass is obtained which contains besides the catalyst proper ($Mn_2O_3$) the basic oxid corresponding to the salt employed, such as manganese oxid-zinc oxid, manganese oxid-magnesium oxid or the like. Preferably the different substances are applied in such a relation that a corresponding excess of basic oxid is present.

Example III: Magnesia grains are impregnated at first with a solution of nitrate of lead and then with a solution of potassium bichromate according to the quantity of lead nitrate employed. After drying and roasting a chromate of lead catalyst is obtained.

In order to prepare a chromate of lead-oxid of copper catalyst the magnesia grains are impregnated first with a solution of lead nitrate, then with a solution of copper nitrate and then with potassium bichromate, whereupon they are dried and roasted. Instead of chromate of lead other combinations of chromic acid with metals, such as silver, bismuth, barium and others may be used either alone or mixed with each other or mixed with other catalysts.

Example IV: Chromites such as the chromite of calcium or of magnesium or ferrochromite in combination with basic carriers will furnish good catalysts for the preparation of nitrogen oxids. Combinations of chromium oxid and zinc have proved to be especially efficient.

In order to obtain a calcium chromite catalyst magnesia or another suitable carrier is impregnated with a solution of chrome-alum and then with the solution of a calcium salt, ammonia is then added and the mass is dried and roasted.

Example V: Finely powdered ruthenium is intimately mixed with magnesia grains, other contact substances being added if necessary, such a substance being for instance finely divided silver, preferably colloidal silver.

Example VI: Magnesia grains are impregnated with a solution of silver nitrate, the nitrate being then converted by the application of heat into metallic silver.

Example VII: Magnesium oxid is impregnated with a watery solution of platinum-ammonium-chlorid or iridium-ammonium-chlorid and then heated to red heat. In this manner catalysts of precious metals on basic carriers are obtained.

In all cases it is preferable to so vary the relative quantities that the basic carrier is in great excess of the catalyst proper. The best relation in each case can easily be ascertained by testing.

The description of the invention and the examples given above make it easy to combine all kinds of catalysts. Instead of combining the desired catalyst directly with the desired basic carrier, it is preferable in many cases to have the catalyst or the basic carrier or both of them formed only at the moment, when the contact substance is forming, such as by the decomposition of suitable salts. One may as well employ native ores such as magnesium carbonate, dolomite, hydrozincite or zinc-spar which will be converted by heating into the desired highly basic metal oxids. Such constituents as may be wanting can be added in the form of corresponding salt solutions, the whole then being heated or treated in any other suitable way.

In some cases, the catalyst proper such as for instance a chromite may be prepared on the basic carrier by converting part of said carrier into chromite, so that the chromite thus formed will represent the catalyst proper, while the basic substance, which has not undergone any change, represents the carrier. In some catalysts prepared in accordance with the present invention it is doubtful whether the catalyst deposited on the basic carrier is combined with it merely in a physical way or whether it has entered into a chemical combination, such as a double salt, with part of the carrier, such combination then acting as a catalyst as well. As has already been explained at the beginning, a so called couple-effect seems to take place between the catalyst on the one hand and the basic carrier on the other hand, and it is difficult to decide whether one component of the couple is the substance directly deposited on or formed upon the carrier or whether it is a combination of said substance with part of the carrier. In any case it is important that the other components have basic qualities. It is therefore to be understood that by an expression such as "catalytically active substances associated with basic substances" I include either a chemical or physical combination of these substances.

I wish it to be understood that by no means any metal or any combination of a metal will, in combination with a highly basic carrier, form an excellent catalyst for the oxidation of ammonia. On the other hand, any one skilled in the art may easily combine good catalysts by simply testing combinations of catalysts proper and of basic carriers, as has been shown in the examples.

I am aware that magnesium oxid has already been proposed as an especially suitable contact carrier for the synthetical preparation of ammonia under high pressure according to Haber.

In the said process the magnesia is said to hold an exceptional position as compared with other highly basic carriers, such as for instance calcium oxid which is said to be absolutely unfit for use. However, it was the more impossible to form any conclusions concerning the behavior of highly basic substances combined with the catalysts proper in the preparation of nitrogen oxids from ammonia which is absolutely different from the synthesis of ammonia, as the magnesia, which had been proved to be a good contact carrier for the synthesis according to Haber, does not for instance furnish a good carrier for the synthetical preparation of ammonia by means of electric discharges.

The oxidation of ammonia in using the contact substances combined in accordance with the present invention is carried out substantially as follows: A mixture of ammonia and air is passed over the contact substances placed in a tube, said substances being at first heated to temperature between 400 and 700 degrees C. After the reaction has been started, it will continue of itself without further heating from outside. By aid of the new catalysts described and claimed a very high output of nitrogen oxids is obtained.

I claim:—

1. The method of oxidizing ammonia which consists in subjecting a gas mixture containing oxygen and ammonia to the action of catalysts formed from highly basic substances and substances capable of accelerating the oxidation of ammonia, said basic substances being in great excess of the catalytic active substances.

2. The method of oxidizing ammonia which consists in subjecting a gas mixture containing oxygen and ammonia to the action of a trivalent metal-containing oxidation catalyst associated with magnesium oxid.

3. The method of oxidizing ammonia which consists in subjecting a gas mixture containing oxygen and ammonia to the action of catalysts formed from magnesium oxid and substances capable of accelerating oxidation of the ammonia, the magnesium oxid being in great excess of the other substances.

4. The method of oxidizing ammonia which consists in subjecting a gas mixture containing oxygen and ammonia to the action of substances capable of accelerating the oxidation of ammonia, associated with highly basic substances, the basic substances being present in a dense state.

5. The method of oxidizing ammonia which consists in subjecting a gas mixture containing oxygen and ammonia to the action of substances capable of accelerating the oxidation of ammonia, associated with magnesium oxid, the magnesium oxid being present in a dense state.

6. The method of oxidizing ammonia which consists in subjecting a gas mixture containing oxygen and ammonia to the action of substances capable of accelerating the oxidation of ammonia, associated with highly basic substances, the basic substances having an artificially increased density.

7. The method of oxidizing ammonia which consists in subjecting a gas mixture containing oxygen and ammonia to the action of substances capable of accelerating the oxidation of ammonia, associated with magnesium oxid, the magnesium oxid having an artificially increased density.

8. The method of oxidizing ammonia which consists in subjecting a gas mixture containing oxygen and ammonia to the action of substances capable of accelerating the oxidation of ammonia, associated with highly basic substances, the basic substances having been rendered denser artificially by heating to a high temperature.

9. The method of oxidizing ammonia which consists in subjecting a gas mixture containing oxygen and ammonia to the action of substances capable of accelerating the oxidation of ammonia, associated with magnesium oxid, the magnesium oxid having been rendered denser artificially by heating to a high temperature.

10. The method of oxidizing ammonia which consists in subjecting a gas mixture containing oxygen and ammonia to the action of substances capable of accelerating the oxidation of ammonia, associated with highly basic substances, the basic substances having been densified previously by treating them with metal salts and roasting the product.

11. The method of oxidizing ammonia which consists in subjecting a gas mixture containing oxygen and ammonia to the action of substances capable of accelerating the oxidation of ammonia, associated with magnesium oxid, the magnesium oxid having been densified previously by treating it with metal salts and roasting the product.

In testimony whereof I have signed my name to this specification in the presence of two subscribing witnesses.

DR. ALEXANDER CLASSEN.

Witnesses:
GERTRUD RAMOUKERS,
HENRY GNADFLIEG.